(12) United States Patent
Tandri (10) Patent No.: US 6,341,371 B1
(45) Date of Patent: Jan. 22, 2002

(54) SYSTEM AND METHOD FOR OPTIMIZING PROGRAM EXECUTION IN A COMPUTER SYSTEM

(75) Inventor: Sudarsan Tandri, Etobicoke (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,036

(22) Filed: Feb. 23, 1999

(51) Int. Cl.$^7$ .................................................. G06F 9/45
(52) U.S. Cl. ..................... 717/5; 717/4; 717/6; 717/8; 717/9; 712/200; 712/207
(58) Field of Search ............... 717/5, 4, 8, 9, 717/6; 712/207, 200, 23

(56) References Cited

U.S. PATENT DOCUMENTS

| | | | | |
|---|---|---|---|---|
| 5,179,702 A | * | 1/1993 | Spix et al. ................... 709/102 |
| 5,247,693 A | * | 9/1993 | Bristol ........................... 717/5 |
| 5,655,096 A | * | 8/1997 | Branigin ..................... 712/200 |
| 5,704,053 A | * | 12/1997 | Santhanam ................. 712/207 |
| 5,724,565 A | * | 3/1998 | Dubey et al. ............... 712/245 |
| 5,740,443 A | * | 4/1998 | Carini ........................... 717/9 |
| 5,797,013 A | * | 8/1998 | Mahadevan et al. ........... 717/9 |
| 5,832,272 A | * | 11/1998 | Kalantery ....................... 717/6 |
| 5,835,776 A | * | 11/1998 | Tirumalai et al. .............. 717/9 |
| 5,854,933 A | * | 12/1998 | Chang ........................... 717/9 |
| 5,857,104 A | * | 1/1999 | Natarjan et al. ............... 717/5 |
| 6,035,125 A | * | 3/2000 | Nguyen et al. ................. 717/9 |
| 6,058,266 A | * | 5/2000 | Megiddo et al. ............... 717/9 |
| 6,091,897 A | * | 7/2000 | Yates et al. .................... 717/8 |
| 6,106,575 A | * | 8/2000 | Hardwick ....................... 717/6 |
| 6,126,328 A | * | 10/2000 | Mallory et al. ................. 717/4 |
| 6,148,437 A | * | 11/2000 | Shah et al. ..................... 717/4 |
| 6,182,206 B1 | * | 1/2001 | Baxter .......................... 712/43 |
| 6,223,281 B1 | * | 4/2001 | Bird et al. ................... 717/241 |
| 6,223,339 B1 | * | 4/2001 | Shah et al. ..................... 717/5 |

OTHER PUBLICATIONS

TITLE: The impact of operating system scheduling policies and synchronization methods of performance of parallel applications, Author: Gupta et al, ACM, 1991.*

TITLE: Using Integer Sets for Data–Parallel Program Analysis and Optimization, Author: Advey et al, ACM. 1998.*

* cited by examiner

*Primary Examiner*—Kakali Chaki
*Assistant Examiner*—Chameli Chaudhuri Das
(74) *Attorney, Agent, or Firm*—McGuireWoods, LLP; Stephen C. Kaufman (57) ABSTRACT

A method, computer system and article of manufacture for optimizing a computer program, the method comprising the steps of executing an application program and profiling selected loops of the executing program. Characteristics of the profiled loops are then compared to corresponding predetermined threshold values and the results of the comparison are used to select an optimization to be applied to subsequent execution of the selected loops. In a preferred embodiment, the optimization is the selection of either a parallel version or a serial version of the loop. Further embodiments provide for the selection of the number of processors for parallel implemented loops and for the selection of an unroll factor in serially implemented loops.

25 Claims, 6 Drawing Sheets

FIG.6 n — UNROLL FACTORS
i — CURRENT UNROLL FACTOR

FIG.7

SYSTEM AND METHOD FOR OPTIMIZING PROGRAM EXECUTION IN A COMPUTER SYSTEM

The present invention relates to a system and method for optimizing program execution and more particularly to profiling of computation loops for dynamic optimization over subsequent runs of the profiled loops.

BACKGROUND OF THE INVENTION

Computer systems having multi-processors have allowed computers to perform multiple tasks at the same time, thus reducing the time necessary to complete an operation. One type of multiprocessor system is a symmetric multiprocessor (SMP) system. Software designed to run on such systems is normally optimized to take advantage of the multiple processors. Typically, this involves coding parallel loops that can be executed using a number of threads that will execute the different iterations of the loop in parallel. This process is normally termed "parallelization". For SMP systems, there are several ways to allow a program to use the parallel processors. A programmer may use automatic parallelization included as a compiler utility or parallelize the code by hand by using directives such as to a custom API, or use thread libraries such as POSIX threads. Automatic parallelization works at the level of loop nests, and can be very effective for programs that spend most of their time in nested loops.

Parallelization results in a certain amount of overhead. This overhead occurs as a result of setting up the parallel environment and subsequently to synchronize at the end of the parallel segment. The potential benefits of parallelization can be realized if this overhead is very small compared to the computation performed. Due to unknown loop bounds and the complexity of performance prediction, a compiler may have parallelized some of the loops that will not benefit from parallelization. In addition, the user may have parallelized loops that do not benefit from parallelization because of the inherent overheads involved.

Thus, profiling was introduced in an attempt to identify and remove such parallelization in some cases. Profiling is an integral part of understanding and tuning an application for improving program performance and may be used to monitor the resource usage during the execution of the application program. A program profile is a characterization of the execution of a program. A profile may typically include the execution time, paging requirements, and cache misses for each subprogram in the application. These are typically some of the resources that are monitored using program profiling. The resource usage information collected by the executing program is then used to fine-tune the performance of the subprograms. This fine-tuning can be done either by the programmer manually or by the compiler. The profiling option '-p' provided in UNIX® environments and the 'PDF' option available with the IBM® XL Fortran compilers are examples of programmer directed profiling. Using the profiling information, the compiler can generate code such that the paths that are executed most often are well optimized.

This form of profiling works in a multi-pass approach consisting of at least two passes. In the first pass, the profiling information is collected and that information is used to fine-tune the application for subsequent program executions. This type of approach is referred to as static profiling because the information gathered during the execution of the program is used after the program terminates.

There are, however, limitations to the static approach. The program is generally run once before optimization. The requirements for optimal performance are used on all subsequent program executions. This can lead to a problem if some of the loops in the program are data dependent, that is the choice between serial or parallel execution of the loops depends on the data set. In this case the programmer has to resort to dual or multi-path code based on the input data. The programmer thus chooses to execute the parallel version or the serial version of the application depending on the input data. This situation results in a familiar problem; the programmer may parallelize loops that should be run serially.

Serially run programs may also be optimized to run faster on uniprocessor systems. In this instance, loop unrolling may be applied at the compiler stage to generate faster executing code. Loop unrolling typically repeats the code in an inner loop a number of times. The number of times the code is replicated within the unrolled loop is termed the unroll factor. Once again one of the deficiencies of current optimizers is that once an optimum unroll factor is determined, it is used on all subsequent program executions. The unroll factor in a loop is dependent not only on the bounds of the loop but also on the machine characteristics which are difficult to model at compile time. At compile time, heuristics are used to select a loop unroll factor. Thus, the optimization is still programmer dependent and does not fully reflect changes in the dataset during execution of the application.

It is an object of the present invention to obviate and mitigate some of these disadvantages.

SUMMARY OF THE INVENTION

The invention seeks to provide a solution to the problem of optimizing computation loops which are data dependant.

In accordance with this invention there is provided a method for optimizing a computer program, comprising the steps of executing an application program, profiling a loop of the executing program to determine a parameter for the loop, comparing the parameter to a threshold value for the loop and flagging the loop for applying an optimization on subsequent execution of the loop depending on said comparing step. Said method may also be provided wherein said optimization comprises a serialization of the loop. Further, said methods may be provided wherein said optimization comprises a parallelization of the loop. The above methods may also be provided wherein the loop includes a parallel and a serial version, and said serialization is a selection of the serial version for execution, and said parallelization is the selection of the parallel version for execution. The methods may also be provided wherein said step of profiling includes sampling the loop at a predetermined frequency. Said step of profiling may also include measuring an execution time of the loop. Further, the threshold value may include a sequential threshold value and a parallel threshold value, said sequential threshold value for determining an execution time above which a serially executing loop will be parallelized, and said parallel threshold value for determining an execution time below which a parallel executing loop will be serialized. The above methods may also be provided wherein said program executes on a computer system having a plurality of processors, and said optimization comprises the selection of a number of processors for execution of the loop and also wherein said threshold value is a preferred execution time for the number of processors selected. Also, the above method may further comprise the step of compiling the program with a plurality of unroll factors prior to execution and wherein said optimization comprises selection of one of said unroll factors for the loop.

There is also provided a computer system for optimizing program execution, comprising means for executing an application program; means for profiling a loop of the executing program to determine a parameter for the loop; means for comparing the parameter to a threshold value for the loop; and means for applying an optimization on subsequent execution of the loop depending on a result of said comparing means. The above computer system may also be provided wherein said optimization comprises a serialization of the loop. Further, said optimization may also comprise a parallelization of the loop. The computer system may also provided wherein the loop includes a parallel and a serial version, and said serialization is a selection of the serial version for execution, and said parallelization is the selection of the parallel version for execution. The computer system may also be provided wherein said means for profiling includes means for sampling the loop at a predetermined frequency. Said means for profiling may also include means for measuring an execution time of the loop. The threshold value may also include a sequential threshold value and a parallel threshold value, said sequential threshold value for determining an execution time above which a serially executing loop will be parallelized, and said parallel threshold value for determining an execution time below which a parallel executing loop will be serialized. Further, the computer system may include a plurality of processors, and said optimization comprises the selection of a number of processors for execution of the loop. The computer system may also be provided wherein said threshold value is a preferred execution time for the number of processors selected. And, the computer system may be further comprise means for compiling the program with a plurality of unroll factors prior to execution and wherein said optimization comprises selection of one of said unroll factors for the loop.

There is also provided an article of manufacture comprising a computer usable medium having computer readable program code embodied therein for optimizing program execution in a computer system, the computer readable program code in said article of manufacture comprising computer readable program code configured to cause a computer system to execute an application program, computer readable program code configured to cause a computer system to profile a loop of the executing program to determine a parameter for the loop, computer readable program code configured to cause a computer system to compare the parameter to a threshold value for the loop and computer readable program code configured to cause a computer system to flag the loop for applying an optimization on subsequent execution of the loop depending on said comparing code. The above article of manufacture may also be provided wherein said optimization comprises a serialization of the loop. Further, the article of manufacture may be provided wherein said optimization comprises a parallelization of the loop. There may also be provided an article of manufacture wherein the loop includes a parallel and a serial version, and said serialization is a selection of the serial version for execution, and said parallelization is the selection of the parallel version for execution. Further, said computer readable program code configured to cause a computer system to profile may include computer readable program code configured to cause a computer system to sample the loop at a predetermined frequency. Further, said computer readable program code configured to cause a computer system to profile may include computer readable program code configured to cause a computer system to measure an execution time of the loop. Also, the threshold value may include a sequential threshold value and a parallel threshold value, said sequential threshold value for determining an execution time above which a serially executing loop will be parallelized, and said parallel threshold value for determining an execution time below which a parallel executing loop will be serialized. There may also be provided the above article of manufacture wherein said computer system includes a plurality of processors, and said optimization comprises the selection of a number of processors for execution of the loop. The article of manufacture may be provided wherein said threshold value is a preferred execution time for the number of processors selected. And, the article of manufacture may further comprise computer readable program code configured to cause a computer system to compile the program with a plurality of unroll factors prior to execution and wherein said optimization comprises selection of one of said unroll factors for the loop.

There is also provided an article of manufacture comprising a computer usable medium having computer readable program code embodied therein for optimizing program execution in a computer system, the computer readable program code in said article of manufacture comprising computer readable program code configured to cause a computer system to execute an application program; computer readable program code configured to cause a computer system to monitor a parameter of a loop of said executing program; computer readable program code configured to cause a computer system to compare the monitored parameter to a threshold value for the loop; and computer readable program code configured to cause a computer system to apply an optimization on subsequent execution of the loop depending on a result of said comparison code.

BRIEF DESCRIPTION OF THE DRAWINGS

An embodiment of the invention will now be described by way of example only, with reference to the accompanying drawings in which like numbers refer to like structures.

DETAILED DESCRIPTION OF THE PREFERRED EMBODIMENTS

Figure 1:
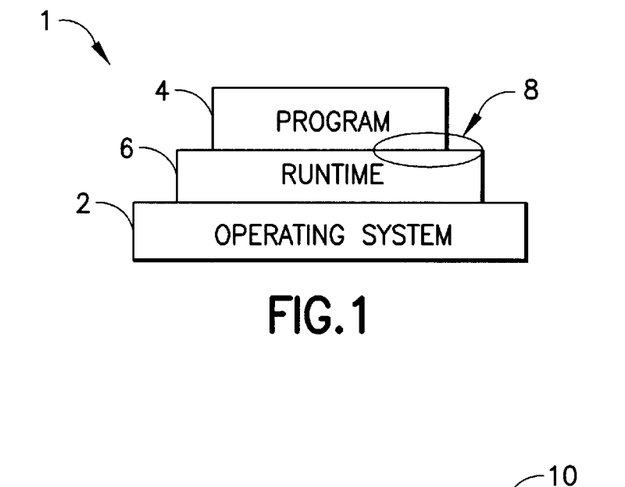
FIG. 1 is a schematic diagram of a software hierarchy in a general computer system.
Figure 2:
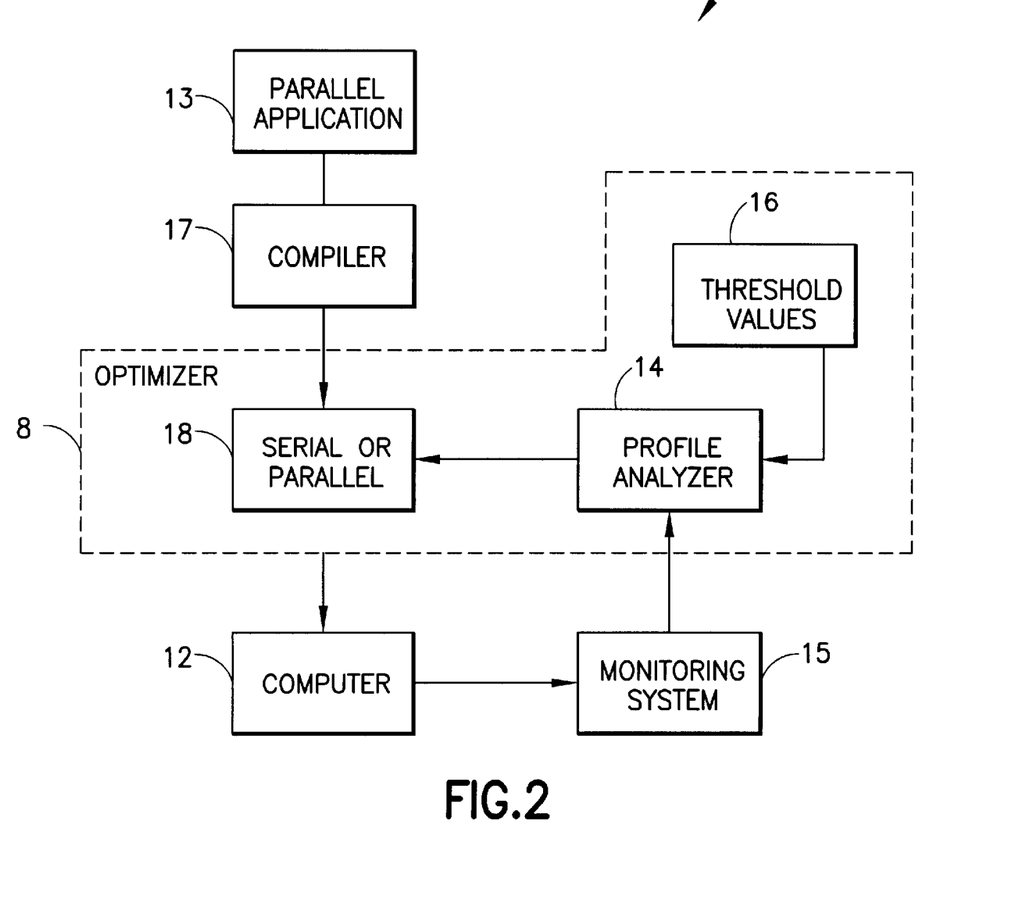
FIG. 2 is a block diagram of a system for dynamically optimizing program execution according to a first embodiment of the present invention system.

Referring to FIG. 1, a block diagram of a typical software hierarchy in a computer system is shown generally by numeral 1. The software hierarchy includes an operating system 2, an application program 4 and a runtime 6 for running the application program. In the preferred embodiment, the runtime includes an optimizer 8 that interacts with the executing program 4 to identify the loops that should be optimized and marks the identified loops for execution according to a suitable optimization scheme, as discussed below. Referring to FIG. 2, a computer system according to a first preferred embodiment of the invention for a parallel application is shown by numeral 10. In this embodiment, the system 10 includes a multiple processor unit computer 12 such as an SMP computer system, an application program 13 having at least one loop compiled by a compiler 17 into both serial and parallel versions and an optimizer 8. The optimizer comprises a profile analyzer 14 for receiving loop execution information at predetermined intervals from a monitoring system 15 and for comparing this monitored information to respective corresponding threshold values 16. The profile analyzer 14 uses the results of this comparison to flag selected loops to run either as a serial loop or as a parallel loop 18. It is assumed that the runtime is capable of executing, on the SMP system, the appropriate version of a loop based on the flag information associated with the loop. The threshold values for the case of a parallel application include a serial threshold value (SEQTHRESHOLD), a parallel threshold value (PARTHRESHOLD) and a profile frequency (PROFILEFREQ). The SEQTHRESHOLD value specifies the time beyond which a loop that is executing serially should be converted to run in parallel. If the time to execute the loop is greater than SEQTHRESHOLD, then the loop will probably benefit from parallel operation even with the accompanying overhead time. The default setting is 5 mSec. The PARTHRESHOLD value specifies the time below which a loop that is executing in parallel should be serialized. If the loop executes faster than the PARTHRESHOLD, then the benefits of parallel execution may not be realized due to the overhead time associated with that type of execution. If this threshold is set to 0, then no loops will be changed to operate serially. The default setting is 0.2 mSec.

The PROFILEFREQ value indicates how often each loop must be sampled to determine whether to change the loop's mode of execution (from serial to parallel or vice versa). If this frequency value is set to zero, then all profiling is turned off. A frequency value of 1 instructs the profile analyzer to monitor each loop every time it is executed. Similarly, a frequency of 2 instructs the profile analyzer to monitor the loop on every other execution. The maximum PROFILEFREQ value is generally determined by the bit size of the integer used to keep track of the sampling frequency. It has been observed that the overhead introduced by the subject invention is negligible, thus a higher value for the profile frequency should reduce this overhead further.

Figure 3:
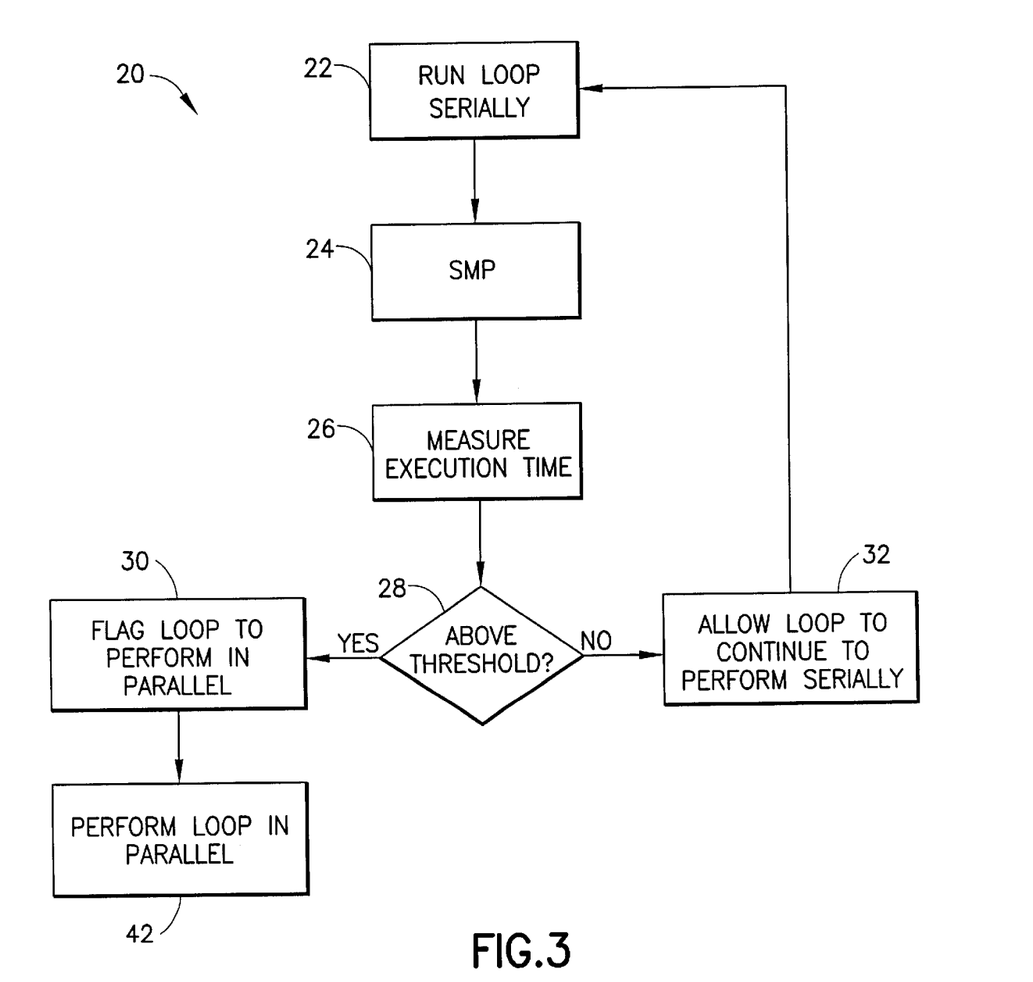
FIG. 3 is a flow diagram of an optimization of the execution of a serially executing loop.

Referring to FIG. 3, a flow diagram showing the profiling of a serially executing loop is indicated generally by the numeral 20. It is assumed that the selected loop has previously been determined to run sequentially and is marked as such as indicated at block 22. The loop is then executed serially on the SMP system 24. The monitoring system 15 then provides the execution time of the loop to the profile analyzer 14. Although in this embodiment, the execution time is used as the performance metric, other metrics such as network contention, memory contention resource usage and such like may be used. Depending on the metric chosen by the profile analyzer 14, a corresponding threshold value must also be chosen.

At block 28, profile analyzer 14 compares the measured execution time (26) to the SEQTHRESHOLD parameter. If the execution time is greater than SEQTHRESHOLD then the profile analyzer flags the loop 30 so that it may be run on the SMP system with the parallel version of the loop the next time it is executed 42. If the execution time is below SEQTHRESHOLD then the loop may continue executing serially 32.

Figure 4:
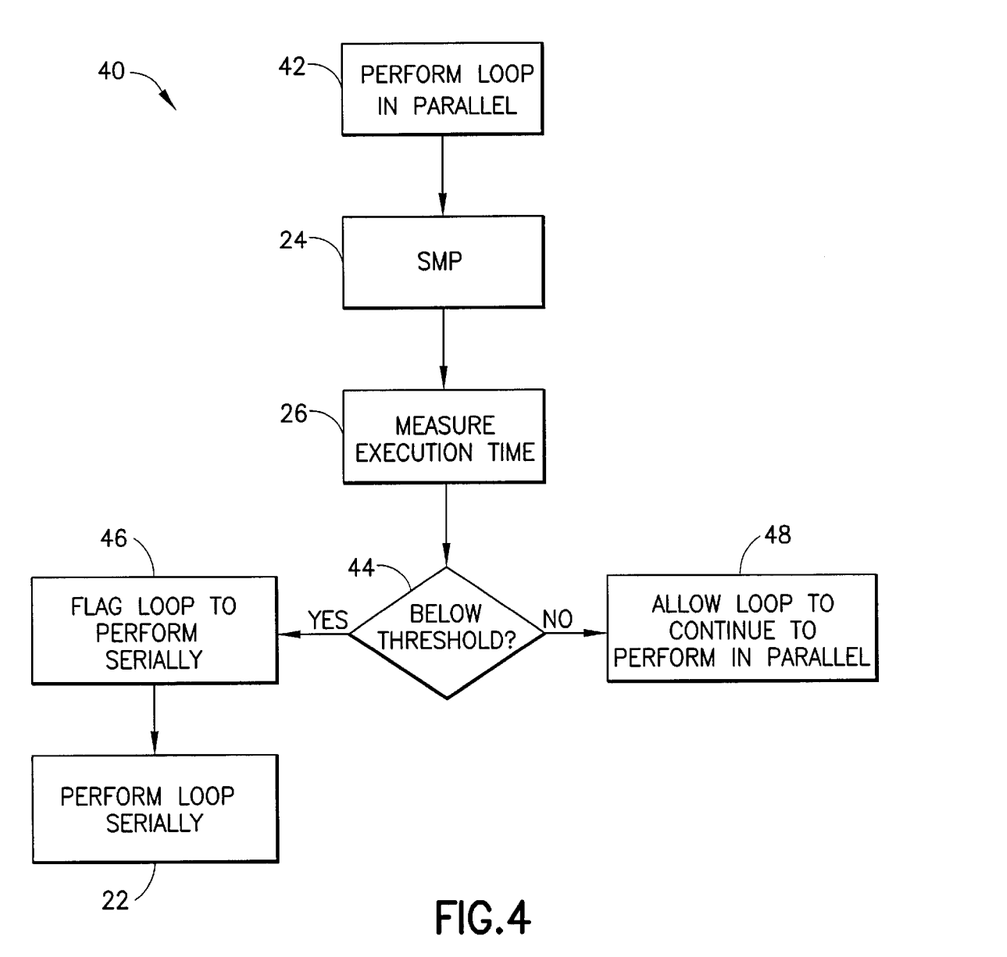
FIG. 4 is a flow diagram of an optimization of the execution of a parallel executing loop.

Referring to FIG. 4 a flow diagram showing the profiling of a parallel executing loop is indicated generally by the numeral 40. This flow diagram is similar to that of FIG. 3, with the differences resulting from the fact that the loop to be profiled has previously been set up to execute in parallel 42 as opposed to serially 22. The general decision making process for a parallel loop is represented by the numeral 40. The loop is processed in parallel by the SMP system 24 and the execution time 26 is again monitored by the profile analyzer 14. The profile analyzer compares the measured execution time with the PARTHRESHOLD parameter. If the time is less than the PARTHRESHOLD then the profiler flags the loop 46 so that the SMP system will run the serial version of the loop the next time it is executed 22. If execution time is greater than PARTHRESHOLD then the parallel version of the loop will be allowed to execute next time it is run 48.

The profiler analyzer will examine each loop every no time it runs, where n is the value assigned to PROFILEFREQ. As previously mentioned, in this example n can range from 0 to 32. Since there are overheads associated with profiling, it may not be worthwhile to profile every time a loop is executed but rather to profile every tenth time a loop is executed.

This method of dynamic profiling can noticeably reduce the execution time of a given program. Loops that incorporate various data sets are, in effect, optimized according to each data set. The benefits of using the dynamic compiler can be seen from Table 1. Specfp95 benchmarks were executed on an 8-processor IBM J-40 computer both with and without dynamic profiling. It may be noted that all measured time is in seconds. N/A means the execution time is greater than 5000 (seconds) and the runs were stopped. The default values as described above were used except for application 7 where PARTHRESHOLD was set to 0.5.

TABLE 1

| | | Serial | Parallel | | | | |
|---|---|---|---|---|---|---|---|
| Application | Compiler | 1 Processor | 1 Processor | 2 Processors | 4 Processors | 6 Processors | 8 Processors |
| 1 | Compiler | 1124.87 | 1152.88 | 604.92 | 345.39 | 280.29 | 247.63 |
|   | Dyn. Prof | 1125.78 | 1134.56 | 605.36 | 336.66 | 289.12 | 246.38 |
| 2 | Compiler | 1715.28 | 1726.48 | 892.73 | 495.79 | 401.89 | 369.14 |
|   | Dyn. Prof | 1699.31 | 1707.33 | 894.02 | 488.13 | 428.11 | 313.91 |
| 3 | Compiler | 728.28 | 727.38 | 506.24 | 464.74 | 558.40 | 697.22 |
|   | Dyn. Prof | 711.05 | 728.67 | 490.65 | 430.37 | 536.55 | 668.26 |
| 4 | Compiler | 1370.18 | 1394.43 | 946.64 | 776.25 | 752.86 | 772.66 |
|   | Dyn. Prof | 1372.97 | 1387.93 | 928.40 | 748.93 | 725.53 | 728.77 |
| 5 | Compiler | 861.23 | 867.41 | 509.64 | 337.91 | 354.11 | 374.57 |
|   | Dyn. Prof | 854.64 | 865.10 | 532.84 | 328.05 | 316.19 | 297.59 |

TABLE 1-continued

|             |          | Serial      | Parallel    |              |              |              |              |
|-------------|----------|-------------|-------------|--------------|--------------|--------------|--------------|
| Application | Compiler | 1 Processor | 1 Processor | 2 Processors | 4 Processors | 6 Processors | 8 Processors |
| 6           | Compiler | 921.79      | 982.64      | 1684.87      | 2960.36      | 4691.79      | 6845.79      |
|             | Dyn. Prof| 919.48      | 984.07      | 802.14       | 720.19       | 711.21       | 712.40       |
| 7           | Compiler | 916.71      | 2374.07     | N/A          | N/A          | N/A          | N/A          |
|             | Dyn. Prof| 949.55      | 2338.05     | 2254.50      | 2235.54      | 2223.53      | 3499.74      |
| 8           | Compiler | 582.02      | 1426.54     | N/A          | N/A          | N/A          | N/A          |
|             | Dyn. Prof| 523.53      | 1581.43     | 1496.82      | 1524.18      | 1505.26      | 1739.66      |
| 9           | Compiler | 1163.99     | 1160.45     | 1183.87      | 1140.54      | 1160.37      | 1993.33      |
|             | Dyn. Prof| 1128.93     | 1109.92     | 1335.40      | 1119.20      | 1116.75      | 1144.52      |
| 10          | Compiler | 905.82      | 1089.54     | 4328.04      | N/A          | N/A          | N/A          |
|             | Dyn. Prof| 907.57      | 1265.30     | 1315.93      | 1333.05      | 1370.66      | 1569.90      |

For the parallel application described in the above embodiments, it is assumed that the selected loop is executing either in parallel with all the processors, or serially with only one processor. In a variation of the first embodiment of the parallel application described with respect to FIG. 2, the profile analyzer may also provide as an output the number of processors to be used by the parallelized loop. Since the threshold values for parallel and serial execution are previously defined as PARTHRESHOLD and SEQTHRESHOLD respectively, it is possible to interpolate between these values to determine the thresholds for an intermediate number of processors. A steady decrease in the number of processors depending on the loop characteristics may be more beneficial in improving the performance of the application. Depending on the loop characteristics some loops may perform better with a small number of processors, but may not perform as well sequentially or with a large number of processors.

Figure 5:
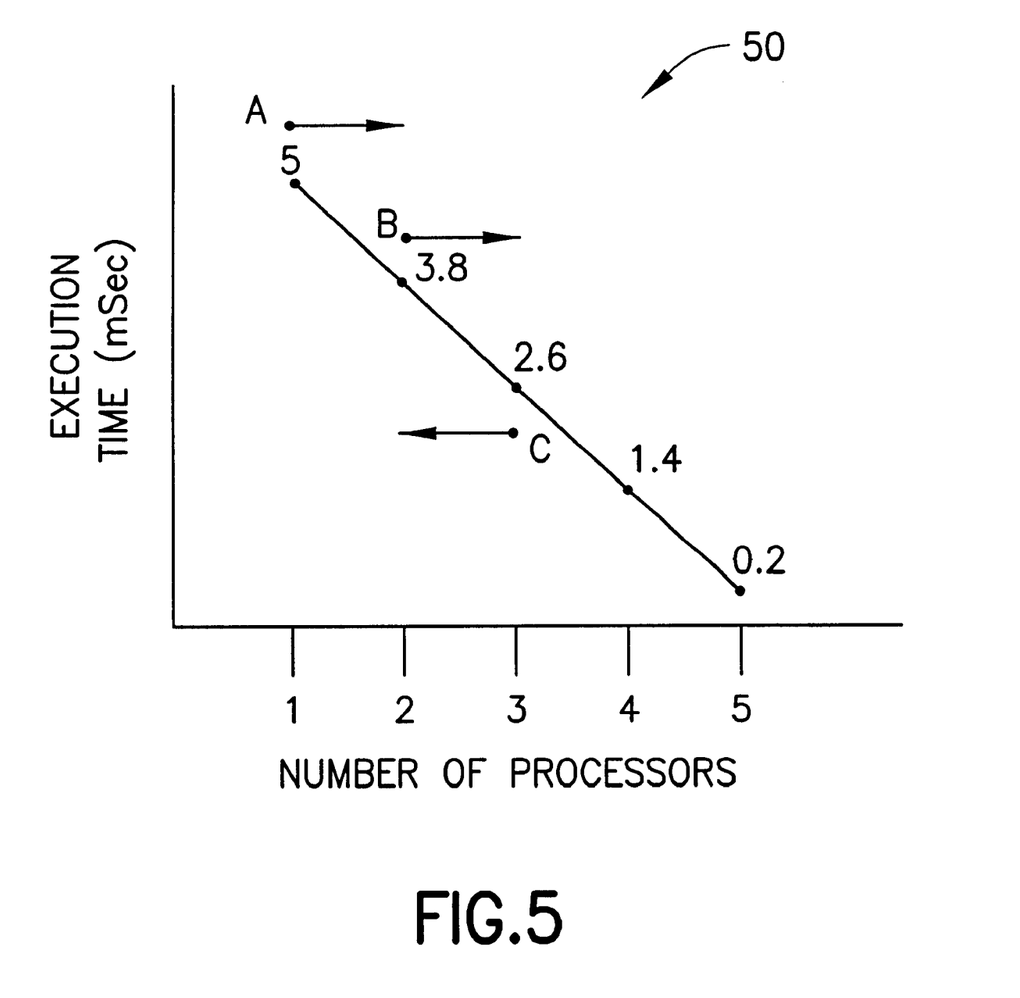
FIG. 5 is a graph showing loop execution time versus the number of processors used.

Referring to FIG. 5, a graph showing the loop execution time versus the number of processors is shown generally by numeral 50. The PARTHRESHOLD and SEQTHRESHOLD values, chosen here to be 0.2 mSec (5 processors) and 5.0 mSec (1 processor) respectively, are al indicated on the graph 50. A line joining these points is termed a "control line". The threshold values for two, three and four processors are determined by interpolation on the graph 50. If the all execution time of a given loop is greater than the threshold (above the control line), the number of processors used will be increased by one on subsequent execution of the loop up until the maximum numbers of processors are used. Conversely, if the execution time of a given loop is a less than the threshold (below the control line), the number of processors used will be decreased by one on subsequent execution of the loop up until only one is being used. For example, using the values indicated in FIG. 5 and assuming the loop is operating serially and takes 5.8 mSec to execute (point A), then next time the loop executes it will use two processors. Assume that the loop then takes 4.2 mSec to operate with two processors (point B). The profile analyzer will then flag the loop to run on three processors the next time it is executed. At this stage if the loop takes 2.2 mSec to operate with three processors (point C) then the profile analyzer will flag the loop to run on two processors the next time it is executed.

The above embodiment is particularly useful in improving the performance of applications in multi-user environments, where many users are competing for processors. Thus by monitoring the system and user time on each processor, the profile analyzer may be used to optimize the performance of the computer.

Figure 6:
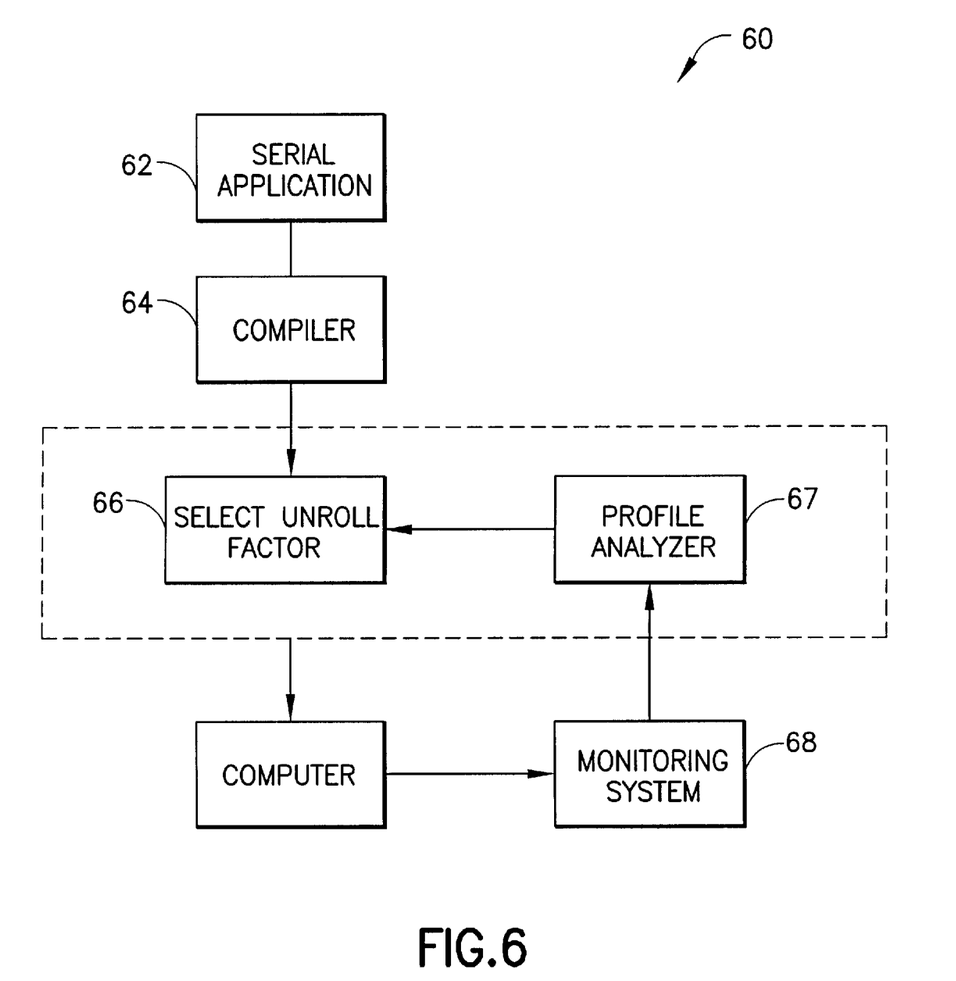
FIG. 6 is a block diagram of a system for dynamically optimizing program execution according to a second embodiment of the present invention system.

Referring to FIG. 6, a computer system according to a second preferred embodiment of the invention for a serial application is shown by numeral 60. In this embodiment, the system 60 generally has a single processor for executing a serial application. The profile analyzer according to the present invention may be used to optimize the performance of the serial application. This embodiment optimizes the unroll factor for loops to exploit the single processor in the system. The serial application 62 is compiled by a compiler 64 to create multiple versions of each loop with different unroll factors 66. As before, the profile analyzer 67 receives the loop characteristics from a monitoring system 68. Then using the most efficient unroll factor, the profile analyzer 67 selects a version of the loop to execute for a particular data set 66. In a process similar to the previously described parallel application optimization, the profile analyzer examines the performance characteristics of a loop and determines which unroll factor to use the next time the loop is executed.

Figure 7:
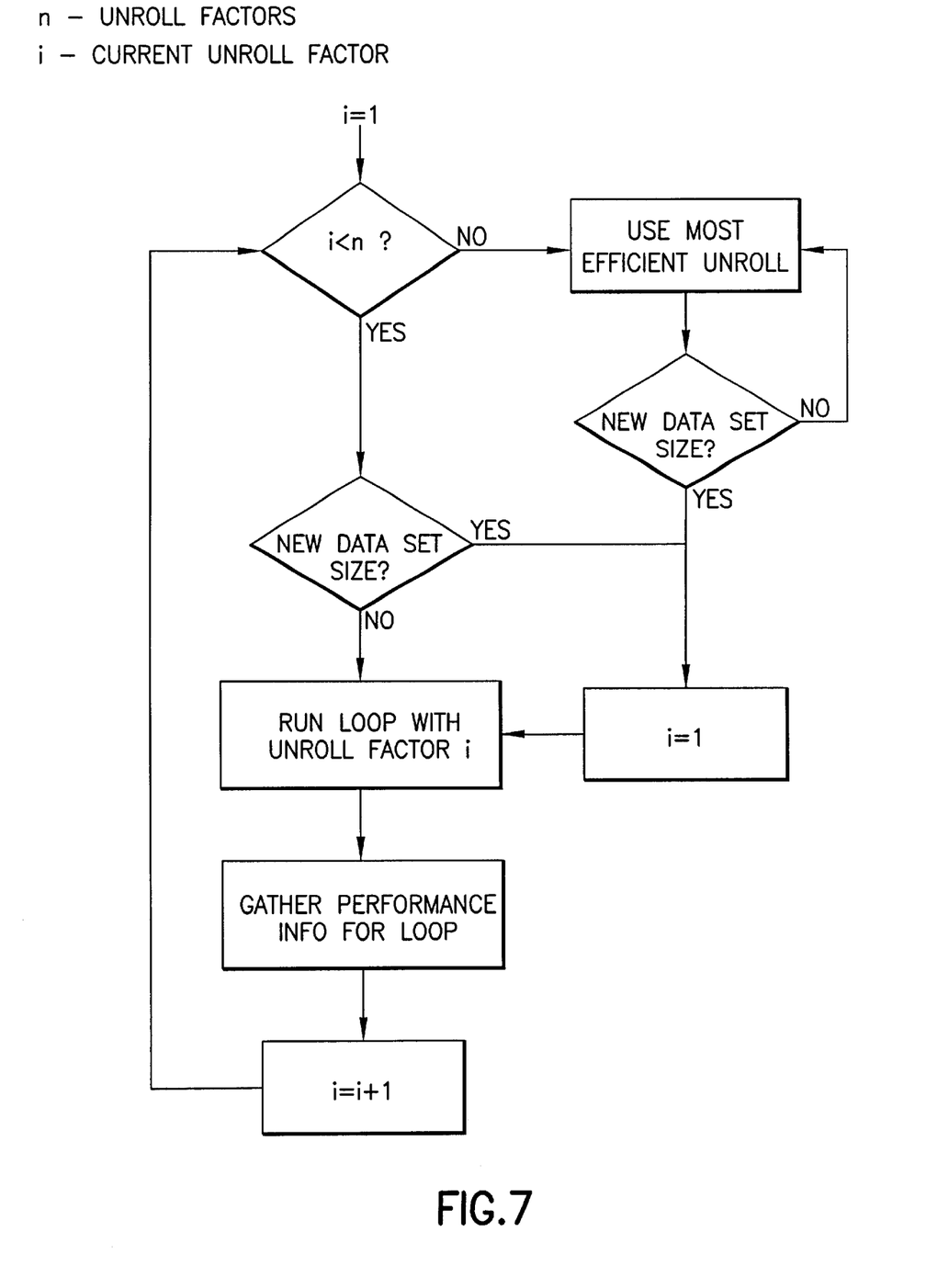
FIG. 7 is a flow diagram of an optimization of the execution of a loop using an unroll factor.

However, in order to determine which unroll factor is best for a particular loop it is necessary to execute that loop with all the unroll factors. For example, there may be three possible unroll factors generated by the compiler. The first time a loop is executed it will use the first unroll factor, the second time it will use the second unroll factor and the third time it will use the third unroll factor. The unroll factor that has the best results based on predetermined factors such as time, memory usage, or the like, will continue to be used until a change in the data set size occurs. At this point the process begins again and all three unroll factors are tested with the new data set. This is more clearly illustrated in the flow diagram of FIG. 7. Therefore, unlike parallel loops where the overhead for profiling, as described with respect to the first embodiment, is negligible, implementing such a profiling according to the second embodiment requires a careful cost/benefit analysis.

The invention may be implemented as an article of manufacture comprising a computer usable medium having computer readable program code means therein for executing the method steps of the invention. Such an article of manufacture may include, but is not limited to, CD-ROMs, diskettes, tapes, hard drives, and computer RAM or ROM. Also, the invention may be implemented in a computer system. A computer system may comprise a computer that includes a processor and a memory device and optionally, a storage device, a video display and/or an input device. Moreover, a computer system may comprise an interconnected network of computers. Computers may equally be in stand-alone form (such as the traditional desktop personal computer) or integrated into another apparatus (such as a cellular telephone).

While this invention has been described in relation to preferred embodiments, it will be understood by those skilled in the art that changes in the details of processes and structures may be made without departing from the spirit and scope of this invention. Many modifications and variations are possible in light of the above teaching. Thus, it should be understood that the above described embodiments have been provided by way of example rather than as a limitation and that the specification and drawing are, accordingly, to be regarded in an illustrative rather than a restrictive sense.

The embodiments of the invention in which an exclusive property or privilege is claimed are defined as follows:

1. A method for optimizing a computer program, comprising the steps of:
   executing an application program;
   profiling a loop of the executing program by periodically sampling the loop at a predetermined frequency and measuring the execution time of the loop;
   comparing the execution time of the loop to a threshold value for the loop; and
   optimizing the subsequent execution of the by changing the loop to one of a serially and a parallel executing loop depending on said comparing step.

2. The method of claim 1 wherein said optimization comprises a serialization of the loop.

3. The method of claim 1 wherein said optimization comprises a serialization of the loop from a parallel loop.

4. The method of claim 3 wherein the loop includes a parallel and a serial version, and said serialization is a selection of the serial version for execution, and said parallelization is the selection of the parallel version for execution.

5. The method of claim 1 wherein the threshold value includes a sequential threshold value and a parallel threshold value, said sequential threshold value for determining an execution time above which the serially executing loop will be parallelized, and said parallel threshold value for determining an execution time below which the parallel executing loop will be serialized.

6. The method of claim 1 wherein said program executes on a computer system having a plurality of processors, and said optimizing of the subsequent execution of a loop comprises selecting the number of processors for execution of the loop.

7. The method of claim 6 wherein said threshold value is a preferred execution time for the number of processors selected.

8. The method of claim 1 further comprising the step of compiling the program with a plurality of unroll factors prior to execution; and wherein said optimization comprises selection of one of said unroll factors for the loop.

9. A computer system for optimizing a program execution, comprising:
   means for executing an application program;
   means for periodically profiling a loop of the executing program by sampling the loop at a predetermined frequency and measuring the execution time of the loop;
   means for comparing the execution time of the loop to a threshold value for the loop; and
   means for optimizing a subsequent execution of the loop by changing the loop to one of a serially and a parallel executing loop depending on a result of said comparing means.

10. The computer system of claim 9 wherein said optimization comprises a serialization of the loop.

11. The computer system of claim 9 wherein said optimization comprises a parallelization of the loop.

12. The computer system of claim 11 wherein the loop includes the parallel and the serial version, and said serialization is a selection of the serial version for execution and said parallelization is the selection of the parallel version for execution.

13. The computer system of claim 9 wherein the threshold value includes a sequential threshold value and a parallel threshold value, said sequential threshold value for determining an execution time above which the serially executing loop will be parallelized, and said parallel threshold value for determining an execution time below which the parallel executing loop will be serialized.

14. The computer system of claim 9 wherein said computer system includes a plurality of processors, and said optimizing of the subsequent execution of a loop comprises selecting the number of processors for execution of the loop.

15. The computer system of claim 14 wherein said threshold value is a preferred execution time for the number of processors selected.

16. The computer system of claim 9 further comprising means for compiling the program with a plurality of unroll factors prior to execution; and wherein said optimization comprises selection of one of said unroll factors for the loop.

17. An article of manufacture comprising a computer usable medium having computer readable program code embodied therein for optimizing program execution in a computer system, the computer readable program code in said article of manufacture comprising:
   computer readable program code configured to cause a computer system to execute an application program;
   computer readable program code configured to cause a computer system to periodically profile a loop of the executing program by sampling the loop at a predetermined frequency and measuring the execution time of the loop;
   computer readable program code configured to cause a computer system to compare the execution time of the loop to a threshold value for the loop; and
   computer readable program code configured to cause a computer system to optimize subsequent execution of the loop to one of a serially and a parallel executing loop depending on a result of said comparing code.

18. The article of manufacture of claim 17 wherein said optimization comprises a serialization of the loop.

19. The article of manufacture of claim 17 wherein said optimization comprises a parallelization of the loop.

20. The article of manufacture of claim 19 wherein the loop includes a parallel and a serial version, and said serialization is a selection of the serial version for execution, and said parallelization is the selection of the parallel version for execution.

21. The article of manufacture of claim 17 wherein the threshold value includes a sequential threshold value and a parallel threshold value, said sequential threshold value for determining an execution time above which the serially executing loop will be parallelized, and said parallel threshold value for determining an execution time below which the parallel executing loop will be serialized.

22. The article of manufacture of claim 17 wherein said computer system includes a plurality of processors, and said optimization comprises the selection of a number of processors for execution of the loop.

23. The article of manufacture of claim 22 wherein said threshold value is a preferred execution time for the number of processors selected.

24. The article of manufacture of claim 17 further comprising computer readable program code configured to cause a computer system to compile the program with a plurality of unroll factors prior to execution; and wherein said optimization comprises selection of one of said unroll factors for the loop.

25. An article of manufacture comprising a computer usable medium having computer readable program code embodied therein for optimizing program execution in a computer system, the computer readable program code in said article of manufacture comprising:

(a) computer readable program code configured to cause a computer system to execute an application program;

(b) computer readable program code configured to cause a computer system to monitor a parameter of a loop of said executing program;

(c) computer readable program code configured to cause a computer system to compare the monitored parameter to a threshold value for the loop; and (d) computer readable program code configured to cause a computer system to apply an optimization on subsequent execution of the loop by changing the loop to one of a serially and parallel executing loop depending on a result of said comparison code.

* * * * *